US006822963B1

(12) United States Patent
Kavak

(10) Patent No.: US 6,822,963 B1
(45) Date of Patent: Nov. 23, 2004

(54) TELECOMMUNICATIONS

(75) Inventor: Nail Kavak, Varby (SE)

(73) Assignee: Telia AB, Farsta (SE)

(*) Notice: Subject to any disclaimer, the term of this patent is extended or adjusted under 35 U.S.C. 154(b) by 0 days.

(21) Appl. No.: 09/529,996

(22) Filed: Sep. 7, 2000

(30) Foreign Application Priority Data

Oct. 22, 1997 (SE) .............................................. 9703846

(51) Int. Cl.$^7$ ........................... H04L 12/28; H04L 12/56
(52) U.S. Cl. ............................. 370/395.21; 370/395.52
(58) Field of Search ............... 370/395.1, 395.21–395.3, 370/395.52–400, 401, 351–356, 389, 396, 397, 395.2, 395.4, 395.42, 395.43, 395.5, 368

(56) References Cited

U.S. PATENT DOCUMENTS

| 5,715,250 A | * | 2/1998 | Watanabe | 370/395.53 |
| 5,764,645 A | * | 6/1998 | Bernet et al. | 370/395.52 |
| 6,021,263 A | * | 2/2000 | Kujoory et al. | 709/232 |
| 6,148,000 A | * | 11/2000 | Feldman et al. | 370/397 |
| 6,167,051 A | * | 12/2000 | Nagami et al. | 370/397 |

FOREIGN PATENT DOCUMENTS

EP            0 790 751        8/1997

* cited by examiner

Primary Examiner—Ajit Patel
(74) Attorney, Agent, or Firm—Oblon, Spivak, McClelland, Maier & Neustadt, P.C.

(57) ABSTRACT

The present invention provides a very simple and scalable architecture which gives a substantially optimal solution for an IP over ATM network service, by exploiting the QoS of the ATM network, providing shortcut communication when necessary, reducing connection setup delay and smoothing migration from the current deployments, while retaining simplicity. This is achieved by introducing three additional functions to the normal operation of the Classical IP model, namely: flow classification/detection, explicit indication of ATM address and QoS, to the receiver, prior to connection setup and receiver initiated connection setup. The present invention also provides, a multi-cast architecture based on an extension to the Multi-cast Address Resolution Service (MARS) architecture known from IETF.

26 Claims, 2 Drawing Sheets

TELECOMMUNICATIONS

BACKGROUND OF THE INVENTION

1. Field of the Invention

The present invention relates to an ATM telecommunications system adapted for the transmission of IP data over ATM and methods of transmitting IP data over an ATM transmission system.

2. Discussion of the Background

The Internet Engineering Task Force (IETF) and ATM Forum have defined several methods that aim to provide shortcuts between IP end-systems across Logical IP System (LIS) boundaries. Examples of such methods are Classical IP, Next Hop Resolution Protocol, Multi-protocol Over ATM, IP switching, Cell switching router, Tag switching, etc. However, none of the methods defined so far utilizes the inherent Quality of Service capability of the ATM network. Furthermore, most of these methods require additional complex control protocols that are difficult to manage. Overall, this means increased investment and management cost for network operators.

SUMMARY OF THE INVENTION

It is an object of the present invention to provide a very simple and scaleable architecture which gives a substantially optimal solution for an IP over ATM network service.

It is a further object of the present invention to:

exploit the QoS of the ATM network;

provide shortcut communication when necessary;

reduce connection setup delay; and smooth migration from the current deployments;

while retaining simplicity.

The present invention introduces three additional functions to the normal operation of the Classical IP model in order to achieve the aforementioned objectives, namely:

(1) flow classification/detection;

(2) explicit indication of ATM address and QoS, to the receiver, prior to connection setup; and (3) receiver initiated connection setup.

The present invention also provides, a multi-cast architecture based on an extension to the Multi-cast Address Resolution Service (MARS) architecture known from IETF. The proposed architecture can be implemented on end-systems as well as in routers. The latter enables smooth and transparent migration towards shortcuts without impacting end-systems. However, this can be regarded as an open implementation issue.

The present invention provides a method via which IP based end-systems that are attached to an ATM network can establish a direct uni-cast connection, even if they belong to different Logical IP Systems (LIS). In a classical IP based operation, only end-systems that belong to the same sub-net (i.e. end-systems that have a common network prefix) can communicate directly. Communication between end-systems that belong to different LISs is only possible through one, or more, routers. In order to send an IP packet to an ATM network, a communication path has to be established, which in turn requires resolution of IP addresses to ATM addresses, in advance. In a wide area network such as ATM with hundreds, or thousands, of end-systems connected to it, communication between end-systems may require multiple router hops. The address resolution process and the signaling procedure between each hop will cause unacceptable delays for many applications. In addition, establishing logical circuits for small flows, e.g., ping, DNS query, may cause scaleability problems and unnecessary overheads.

Much effort has recently been spent by standardization bodies and different for a to remedy the aforementioned problem. Most notably the Internet Engineering Task Force (IETF) has defined a method, currently an RFC draft under the name Next Hop Resolution Protocol (NHRP), that provides a shortcut for direct communication between IP end-systems belonging to different sub-nets, or LISs. However, even the current NHRP protocol fails to address the following problems:

1. Reduction in the number of open connections, or virtual circuits, in a WAN;
2. Reduction in the connection setup delay; and
3. Explicit indication of ATM addresses and Quality of Service Other known solutions like IP switching (from Ipsilon), Cell switching router (from Toshiba), or Tag switching (from Cisco), require either control architectures and protocols which are too complex, or they lack QoS support.

The present invention addresses the three aforementioned problems. Point (1) is solved by the use of flow detection, point (2) is solved by providing receiver initiated connection setup and point (3) is solved by means of the provision of explicit indications of QoS parameters in a special control message to help the receiver to require the appropriate traffic and QoS.

According to a first aspect of the present invention, there is provided an ATM transmission system, adapted for the transmission of IP data, having at least two end-user terminals and a plurality of routers, said ATM transmission system including at least two LISs and adapted to handle both intra-LIS and inter-LIS traffic, characterized in that first connection means are provided to establish a first communication path for short lived transmissions, between first and second end-user terminals, on a hop-by-hop basis, in that signaling means are provided for exchanging call connection messages between said first and second end-user terminals over said first communications path, in that second connection means are provided to establish a second, direct, communications path, by-passing said routers between said first and second end-user terminals, and in that long lived data transmissions are transmitted over said second communications path.

Said first communications path may be a pre-established default path.

Said first end-user terminal may be a call initiating terminal, and said first end-user terminal may include signaling means for transmitting a control message to said second end-user terminal over said default path, said control message containing, inter alia, an ATM address for said first terminal and QoS parameters for said first terminal.

Said second end-user terminal may have check means for checking, on receipt of a control message from said first terminal, that said second end-user terminal has sufficient available resource to handle transmission from said first terminal, and said second connection means may establish said second communications path, if said second terminal has sufficient available resource.

Said second end-user terminal's signaling means may transmit a message containing an error code, to said first end-user terminal, in the event that said second end-user terminal has insufficient resource to handle transmission from is said first terminal.

Short lived intra-LIS data transmissions may be transmitted over a pre-established default path established by a call initiating end-user terminal.

Long lived intra-LIS data transmissions may be transmitted over an SVC established by a call initiating end-user terminal.

Short lived inter-LIS data transmission may be transmitted over said first communications path.

End-user terminals may have data detector means for detecting data flows and classifying data flows as one of:

short lived intra-LIS;

long lived intra-LIS;

short lived inter-LIS; or

Long lived inter-LIS.

ATM VCs may only be established for the transmission of long lived data flows.

Short lived data flows may be transmitted over a system default path by-passing address resolution and connection set-up procedures.

IP data may be transmitted over said first communications path prior to establishment of said second communications path.

An end-user terminal, or router, may have multiplexing means for multiplexing a plurality of connections over a single VC.

Said routers may include processor means for processing control messages.

Control messages may be processed in:

a router;

an ARP server; or an end-user terminal.

Said system may be adapted to support multi-casting based on the IETF MARS model.

According to a second aspect of the present invention, there is provided an end-user terminal adapted for use with an ATM transmission system as claimed in any previous claim, characterized in that said end-user terminal includes first connection means for establishing communications paths for short lived transmissions, a second connection means for establishing communications paths for long lived transmissions by-passing routers, signalling means for exchanging call connection messages, check means for checking, on receipt of a control message, said end-user terminal's available resource, and data detector means for detecting and classifying data flows.

According to a third aspect of the present invention, there is provided a method of transmitting IP data over an ATM transmission system having at least two end-user terminals, a plurality of routers and at least two LISs, said method adapted to handle both intra-LIS and inter-LIS traffic, characterized by:

for long lived inter-LIS transmissions between a first end-user terminal and a second end-user terminal, first establishing a first communication path for short lived transmissions, between said first and second end-user terminals, on a hop-by-hop basis;

exchanging call connection messages between said first and second end-user terminals over said first communications path;

establishing a second, direct, communications path, by-passing said routers, between said first and second end-user terminals; and transmitting long lived data transmissions over said second communications path.

Said first communications path may be a pre-established default path.

Said first end-user terminal may be a call initiating terminal, and said first end-user terminal may transmit a control message to said second end-user terminal over said default path, said control message containing, inter alia, an ATM address for said first terminal and QoS parameters for said first terminal.

Said second end-user terminal may, on receipt of a control message from said first end-user terminal, check that said second end-user terminal has sufficient available resource to handle transmission from said first terminal, and may establish said second communications path, if said second terminal has sufficient available resource.

Said second end-user terminal may transmit a message containing an error code, to said first end-user terminal, in the event that said second end-user terminal has insufficient resource to handle transmission from said first terminal.

Short lived intra-LIS data transmissions may be transmitted over a pre-established default path established by a call initiating end-user terminal.

Long lived intra-LIS data transmissions may be transmitted over an SVC established by said a call initiating end-user terminal.

Short lived inter-LIS data transmission may be transmitted over said first communications path.

End-user terminals may detect and classify data flows as one of:

short lived intra-LIS;

long lived intra-LIS;

short lived inter-LIS; or long lived inter-LIS.

ATM VCs may only be established for the transmission of long lived data flows.

Short lived data flows may be transmitted over a system default path by-passing address resolution and connection set-up procedures.

IP data may be transmitted over said first communications path prior to establishment of said second communications path.

An end-user terminal, or router, may multiplex a plurality of connections over a single VC.

Control messages may be processed in said routers.

Control messages may be processed in:

a router;

an ARP server; or an end-user terminal.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
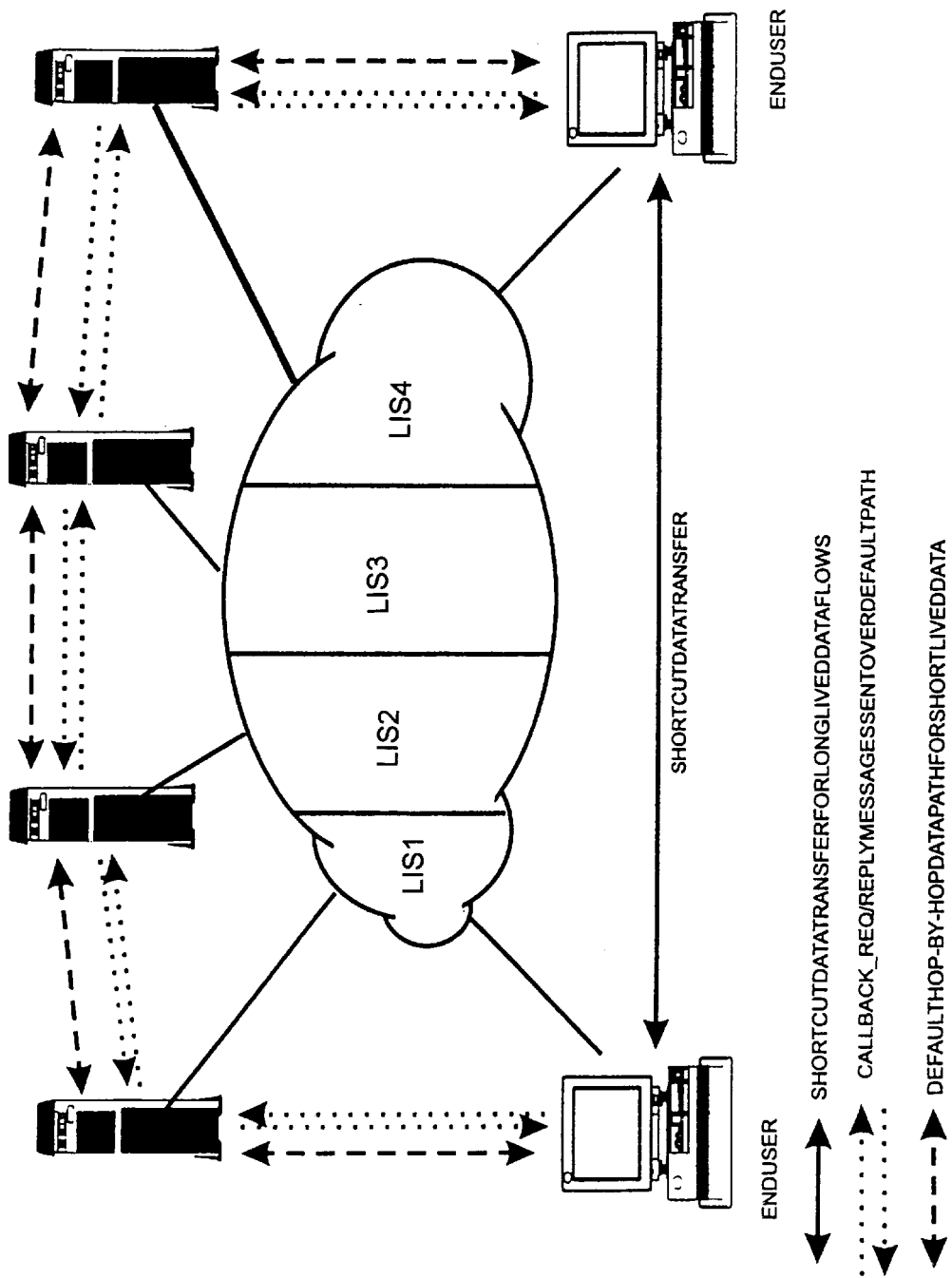
FIG. 1 illustrates, in schematic form, an ATM transmission system used for transmission of IP data, according to the present invention.

In order to facilitate an understanding of the present invention a glossary of terms used in the description of the present invention is provided below:

ARP: Address Resolution Protocol
ATM: Asynchronous Transfer Mode
DNS: Domain Name System
FTP: File Transfer Protocol
IETF: Internet Engineering Task Force IP: Internet Protocol
LIS: Logical IP System
MARS: Multicast Address Resolution Service
NHRP: Next Hop Resolution Protocol
OSPF: Open Shortest Path First Protocol
QoS: Quality of Service
RFC: Request for Comment
SVC: Switched Virtual Circuit
VC: Virtual Circuit
WAN: Wide Area Network As previously explained, the present invention provides a method via which IP based end-systems that are attached to an ATM network can establish a direct uni-cast connection, even if they belong to different Logical IP Systems (LIS). In a classical IP based operation, only end-systems that belong to the same sub-net can communicate directly. Communication between end-systems that belong to different LISs is only possible through one, or more, routers. In order to send an IP packet to an ATM network, a communication path has to be established, which in turn requires resolution of IP addresses to ATM addresses, in advance. In a wide area network communication between end-systems may require multiple router hops. The address resolution process and the signaling procedure between each hop may cause unacceptable delays for many applications. Establishing logical circuits for small flows may cause scaleability problems and unnecessary overheads.

Current protocols do not address the following problems:

1. Reduction in the number of open connections, or virtual circuits, in a WAN;
2. Reduction in the connection setup delay; and
3. Explicit indication of ATM addresses and Quality of Service The present invention resolves these three problems by:
using flow detection;
providing receiver initiated connection setup; and
providing explicit indications of QoS parameters in a special control message.

For many applications, such as ping, DNS query, or ARP, it is not necessary for end-systems to establish an end-to-end ATM connections (Virtual Circuits), simply because these applications do not generate much traffic and are short-lived. The address resolution process and signaling incurs a substantial delay and overhead that cannot be justified. Thus, the end-systems need to setup ATM VCs only for applications that are long lived, such as ftp, telnet, or applications that have stringent time requirements. Short-lived applications can be sent over a pre-established hop-by-hop default path.

In order to classify packets, end-systems must apply algorithms to detect flows. A flow is a sequence of packets that has the same source and destination address and, possibly, transport layer protocol as well as port-nr (indicated in the IP header).

The present invention provides a flow detection algorithm in which short lived flows can be transferred over the system default path, by-passing the address resolution function and connection setup procedures. There are many ways to detect a flow, some examples of which are set out below:
(1) Source address, Destination address
(2) Source address, Destination address, port nr
(3) Source address, Destination address, transport protocol, port nr
(4) Source address, Destination subnet-nr The exact choice of flow classification algorithm depends on the particular implementation chosen. The advantages gained with flow detection are the reduced number of open circuits, more efficient utilization of network resources and reduced delay, since neither address resolution, nor connection setup, is required.

Considering the locality and the duration of flows, four different communication scenarios may arise between any two end-systems, see Table 1

TABLE 1

|  | Short lived | Long lived |
| --- | --- | --- |
| Intra LIS | A | B |
| Inter LIS | C | D |

In scenario A, it is assured that end-systems belong to the same sub-net and that they would like to transfer short lived flows. In this scenario, it can be assumed that establishing a direct SVC is not justified, even if both end-systems belong to the same sub-net.

In scenario B, the end-systems also belong to the same sub-net, but they would like to transfer long-lived flows. Here, it may be assumed that end-systems need to establish direct SVCs.

In scenario C, end-systems do not belong to the same sub-net, but they would like to send short lived flows. It can again be assumed that the establishment of SVCs is not justified.

In scenario D, end-systems reside on different sub-nets and they would like to send long-lived flows. In this case, end-systems need to establish a shortcut path, without traversing any routers.

Thus, it may be said that the decision on whether a direct SVC should be established, or not, depends on the duration of flows and not on the LIS locality.

For short lived flows in intra-LIS it is assumed that the short-lived flows are transferred through pre-established paths within intra-LIS, since the cost incurred with establishment of SVCs and delay caused due to establishment of connections is not justified.

If, for long lived flows, an end-system detects that the destination is within the same sub-net, i.e. intra-LIS, and that through the flow classification mechanisms, described above, the end-system wishes to establish a connection, it queries the ARP server to get the destination ATM address. Once the destination ATM address is resolved, the sender can establish a direct connection to the destination. RFC 1577 (Classical IP over ATM) describes the procedures for detecting an ARP server, registration/deregistration to an ARP server and registration/deregistration of ATM addresses and corresponding IP addresses. For details of these procedures reference should be made to RFC 1577. In this respect, intra-LIS communication is similar to Classical-IP over ATM already defined in RFC 1577.

If the destination is outside the sender's LIS, i.e. inter-LIS, but the flow is short-lived, the data will be transferred through the default path, hop-by-hop. Again, cost of connection establishment is not justified in this ease.

The heart of the problem lies with long lived inter-LIS flows. While transfer of short-lived flows, over the default path, provides a simple means to solve the delay and scaleability problem, establishment of connections and reservation of resources for long-lived flows is still required. Since any-to-any pre-established connections result in an $O(N^2)$ problem, hop-by-hop behavior is not adequate for connections that require high performance and short-delays. Hence a procedure is required to bypass routers on that data path. The algorithm works as described below.

The end-system uses the default path to transfer initial data packets, if there is no associated virtual circuit (VC). It is assumed that the default path is pre-established and is also used for other purposes, like the transfer of OSPF routing messages. At the same time the end-system issues an explicit control message, details of which are described later, to the receiver, through the same default path. Such a control message also includes the ATM address of the sender, as well as its QoS parameters. Upon receiving the control message, the receiver first checks whether it can support the required resources. If so, it sets up and ATM connection on the reverse path using the ATM address of the initiator, indicated in the control message. Once the connection is established, the sender can start sending data through the shortcut path instead of the default path. In the meantime, all data will be continuously transferred through the default path (although in most cases all data will be sent over the shortcut). This arrangement is illustrated schematically in FIG. 1, in which the default hop-by-hop path for short lived data and the short cut path between LIS1, LIS2, LIS3, and LIS4, bypassing routers, is shown for a long lived inter LIS connection.

It is recommended for end-users not to cache, i.e. learn, or retain, ATM end-system addresses, because, end-systems need to send explicit messages to indicate their QoS requirements anyway.

It is not recommended that VCs should be setup for every flow. It is believed that such a high granularity may cause some scaleability problems in a Wide Area Network (WAN). Instead an end-system, or router, can multiplex several connections over the same VC, for example, by using sub-net, or domain addresses, rather than destination addresses and port numbers. Further details on the flow detection are given below.

Whether the procedures for detecting flows and the intelligence for processing control messages resides in the end-systems, or in the routers depends on design choices for a particular implementation. The main advantage of locating the logic in the routers is end-user transparency, i.e. the method of the present invention would, in that case, have no dependency on the end-systems i.e. it will require no changes to the existing implementations.

It is also a design choice for end-systems to establish a connection to the ultimate destination directly, in which case, the explicit call establishment message, described below, will not be terminated in the router, but will instead be sent all the way to the ultimate destination. The choice of processing the explicit message in the router, or ARP server, or in the end-system is indicated in the header of the request/reply messages.

To establish a shortcut in inter-LIS, an end-system issues a CALL_BACK_req message, indicating its own ATM address and the QoS requirements. This message will propagate through hop-by-hop all the way to its final destination. Upon receiving a CALL_BACK_req message, the receiver checks the sender's QoS requirements. If, and when, it decides to establish a connection, it issues back UNI 3.x, or UNI 4.x, messages to establish a connection from the reverse direction, at the same time it issues a CALL_BACK_reply message indicating the result (success/failure). If no reply is received within x-seconds, the message will be resent n-times (x and n are predefined parameters).

In the case where the receiver does not want to establish the ATM connection, e.g. due to unavailable resources, it sends back a negative CALL_BACK_reply message indicating an error code.

The CALL_BACK_req and CALL_BACK_reply messages are transferred through a pre-established path (VPI=0, VCI=15) with very small resources (Available Bit Rate/Unspecified Bit Rate).

It is not even necessary for end-systems to learn the ATM addresses of the end-systems through caching.

Releasing a connection can be performed, or initiated, either by the sending, or receiving, entity using RELEASE_req messages already defined in the UNI-standard signaling messages.

Table 2 illustrates the fields belonging to CALL_BACK_req/reply messages. Most of the fields are exactly identical to the SETUP and CONNECT messages used in UNI 3.x and UNI 4.0 messages. As an option, ATM Adaptation layer and Broadband Low layer information can be included, so that the receiver can check whether it can support a sender's QoS requirements. The traffic and QoS messages are Informational Elements (IE) not being processed by the network, instead they are sent transparently to the end-system.

TABLE 2

| CALL_BACK_req/reply message fields | Value/meaning |
| --- | --- |
| Request ID | a seq. nr to keep track of multiple requests |
| Source Proto Len | source protocol length |
| Dest. Proto Len | destination protocol length |
| Sources ATM Subaddress (variable length) | the ATM subaddress of the source |
| Source protocol address (variable length) | the protocol address of the source |
| Destination protocol address (variable length) | the protocol address of the destination |
| QoS parameters | Cell delay variation, cell loss rate, etc., compliant with UNI.x messages |
| Min Traffic parameters | min. acceptable traffic descriptor applies to UNI 4.0 |
| Alt. Traffic descriptor | allows negotiation of traffic parameters |
| Maximum transmission unit | enables the receiver to chose the right size transmission unit |
| End-to-End transmit delay | enables the receiver to check whether the application can tolerate the end-to end transit delay |
| Result code | includes reason code for failure or success |

Multi-casting, employed by the present invention, is based on the IETF Multi-casting Address Resolution Service (MARS) model. MARS acts as a registry of multi-cast group membership, storing the ATM addresses of IPATM endpoints who consider themselves to be members of a given IP multi-cast group at any instant in time. MARS control messages support the distribution of multi-cast group membership information between the MARS and IPATM endpoints. IPATM endpoints query the MARS when they need to know the ATM level identities of an IP multi-cast group and inform MARS whenever they, themselves, join, or leave, an IP multi-cast group. The MARS keeps all multi-cast-capable IPATM endpoints informed of group membership changes.

Figure 2:
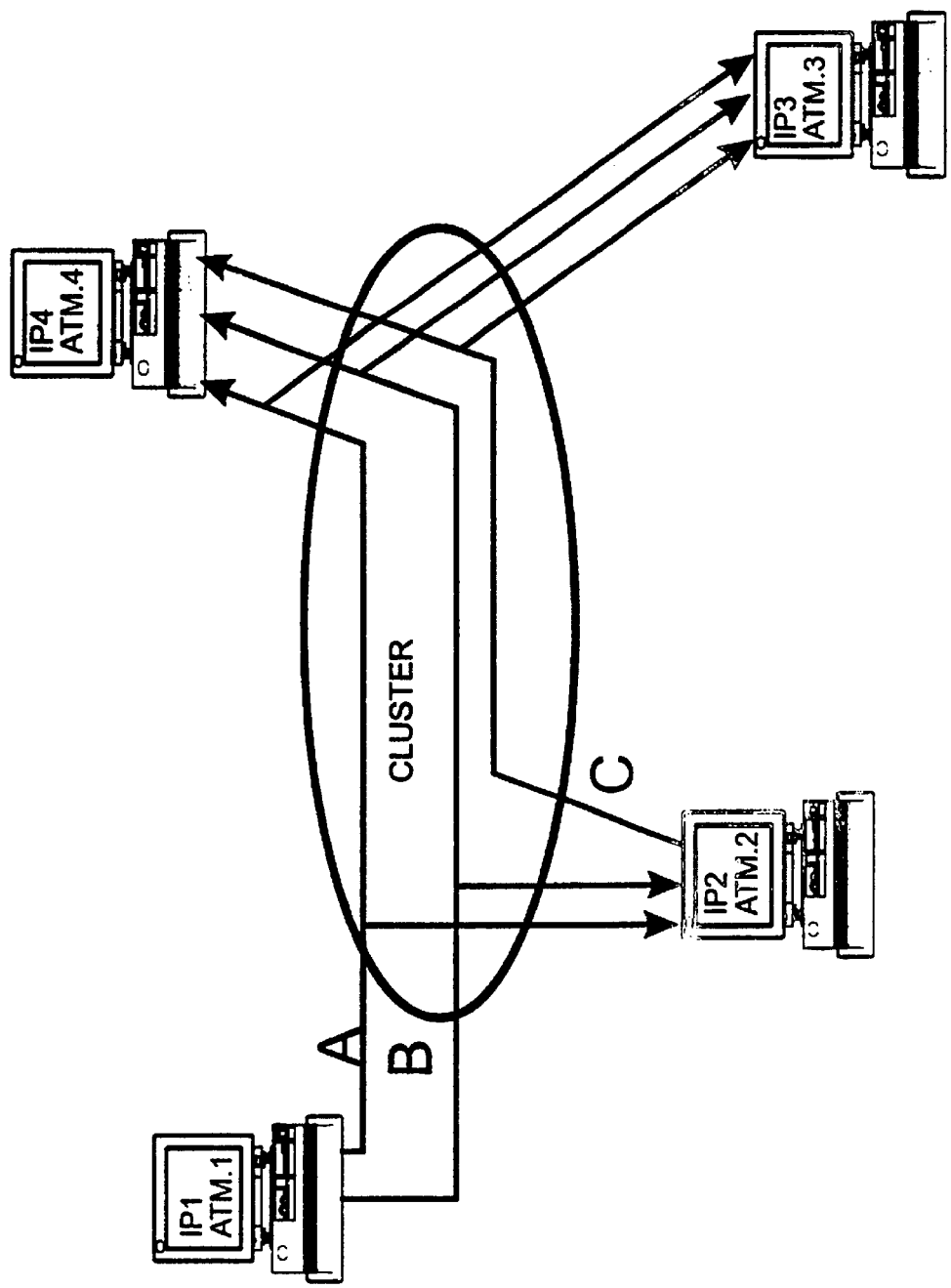
FIG. 2 illustrates, in schematic form, two endpoints sending to IP multi-cast destinations.

In FIG. 2, an example is shown with two endpoints sending to IP multi-cast destinations.

Endpoint 1 is sending to two different groups and so has established separate forwarding paths. For clarity the MARS, cluster control-VC, and private VCs from MARS to MARS clients are not shown. MARS_REQUEST's for either 224.0.20.5, or 224.2.30.1, receive the same set of ATM addresses {atm.2, atm.3, atm.4)—from the MARS. See MARS tables, Table 3. As allowed by RFC 1112, endpoint 1 is not even a member of either group to which it is sending. Endpoint 2's forwarding path only has two leaf nodes, as it is recognized, itself, in the list returned in the MARS_MULTI. Once the outgoing VCs are established, both endpoints 1 and 2 will be monitoring traffic on ClusterControlVC for update MARS_JOIN and MARS_LEAVE messages. If one of these messages arrives indicating a new leaf node for either 224.0.20.5, or 224.2.30.1, then endpoint 1 will add, or remove, a leaf node as appropriate. Endpoint 2 will do the same for changes applying to 224.0.20.5. The designations of the paths are shown in Table 4.

TABLE 3

MARS tables

{224.0.20.5, atm.2, atm.3, atm.4}
{224.2.30.1, atm.3, atm.3, atm.4}

TABLE 4

| Designation in FIG. 2/2 | Traffic |
|---|---|
| A | From ip.1 To 224.2.30.1 |
| B | From ip.1 To 224.0.20.5 |
| C | From ip.2 To 224.0.20.5 |

Alternatively, multipoint VCs can be shared. The same point-to-multipoint VC could be used as the intra-cluster forwarding path for transmissions both to 224.0.20.5 and 224.2.30.1.

While MARS allows direct multi-casting between LIS members, inter-LIS multi-casting still requires traversing multi-casting routers. For inter-LIS traffic, there are two possible alternatives. In alternative 1, multi-cast routers may themselves constitute a virtual backbone linking multi-cast routers. In this case, any inter-sub-net traffic is transmitted onto the virtual backbone as an intra-cluster multi-cast to all routers. From there it travels directly to the destination LIS, taking only two level IP-level hops regardless of the source and destination LISs. In alternative 2, LIS and cluster membership is decoupled. The cluster consists of an integral number of LISs. Each host is configured with the address of the same MARS entity. Once registered with the MARS they will all use intra-sub-net level multi-casting for traffic between each other—regardless of the sub-net to which their uni-cast IP addresses indicate they are members. Multi-cast traffic will cut through LIS boundaries by virtue of having a single MARS managed host in both LISs.

What is claimed is:

1. An ATM transmission system, adapted for transmission of IP data, having at least first and second end-user terminals and a plurality of routers, said ATM transmission system including at least two LISs and adapted to handle both intra-LIS and inter-LIS traffic, comprising:

for establishing a first communication path for short lived transmissions, between first and second end-user terminals, on a hop-by-hop basis;

signaling means for exchanging call connection messages between said first and second end-user terminals over said first communication path; and second connection means for establishing a second, direct, communication path, by-passing said plurality of routers between said first and second end-user terminals, wherein long lived data transmissions are transmitted over said second communication path;

said first communication path is a pre-established default path;

first end-user terminal is a call initiating terminal, said first end-user terminal includes signaling means for transmitting a control message to said second end-user terminal over said default path, said control message comprising, inter alia, an ATM address for said first terminal and QoS parameters for said first terminal;

said second end-user terminal has check means for checking, on receipt of said control message from said first terminal, that said second end-user terminal has sufficient available resources to handle a transmission from said first terminal, and said second connection means establishes said second communication path, if said second terminal has sufficient available resources.

2. An ATM transmission system, as claimed in claim 1, wherein said signaling means of said second end user transmits a message containing an error code, to said first end-user terminal, in the event that said second end-user terminal has insufficient resources to handle said transmission from said first terminal.

3. An ATM transmission system, as claimed in claim 1, wherein short lived intra-LIS data transmissions are transmitted over a pre-established default path established by a call initiating end-user terminal.

4. An ATM transmission system, as claimed in claim 1, wherein long lived intra-LIS data transmissions are transmitted over an SVC established by a call initiating end-user terminal.

5. An ATM transmission system, as claimed in claim 1, wherein short lived inter-LIS data transmission are transmitted over said first communication path.

6. An ATM transmission system, as claimed in claim 3, wherein said first and second end-user terminals have data detector means for detecting data flows and classifying data flows as one of:

short lived intra-LIS;

long lived intra-LIS;

short lived inter-LIS; and long lived inter-LIS.

7. An ATM transmission system, as claimed in claim 6, wherein ATM VCs are only established for the transmission of long lived data flows.

8. An ATM transmission system, as claimed in claim 6, wherein short lived data flows are transmitted over a system default path by-passing address resolution and connection set-up procedures.

9. An ATM transmission system, as claimed in claim 1, wherein IP data is transmitted over said first communication path prior to establishment of said second communication path.

10. An ATM transmission system, as claimed in claim 1, wherein at least one of said first and second end-user terminals, or at least one of said plurality of routers, includes multiplexing means for multiplexing a plurality of connections over a single VC.

11. An ATM transmission system, as claimed in claim 1, wherein at least one of said plurality of routers include processor means for processing control messages.

12. An ATM transmission system, as claimed in claim 1, wherein control messages are processed in at least one of:

one of said plurality of routers;

an ARP server; and
one of said first and second end-user terminals.

13. An ATM transmission system, as claimed in claim 1, wherein said system is configured to support multi-casting based on an IETF MARS model.

14. An end-user terminal adapted for use with an ATM transmission system as claimed in claim 1, said end-user terminal including:
first connection means for establishing communications paths for short lived transmissions,
second connection means for establishing communications paths for long lived transmissions by-passing routers,
signaling means for exchanging call connection messages,
check means for checking, on receipt of a control message, available resources of said end-user terminal, and
data detector means for detecting and classifying data flows.

15. A method of transmitting IP data over an ATM transmission system having at least two end-user terminals, a plurality of routers and at least two LISs, said method adapted to handle both intra-LIS and inter-LIS traffic, comprising:
for long lived inter-LIS transmissions between a first end-user terminal and a second end-user terminal, first establishing a first communication path for short lived transmissions, between said first and second end-user terminals, on a hop-by-hop basis;
exchanging call connection messages between said first and second end-user terminals over said first communication path;
establishing a second, direct, communication path, by-passing said routers, between said first and second end-user terminals; and
transmitting long lived data transmissions over said second communication path, wherein
said first communication path is a pre-established default path,
said first end-user terminal is a call initiating terminal,
said first end-user terminal transmits a control message to said second end-user terminal over said default path, said control message comprising, inter alia, an ATM address for said first terminal and QoS parameters for said first terminal, and
said second end-user terminal, on receipt of said control message from said first end-user terminal, checks that said second end-user terminal has sufficient available resources to handle a transmission from said first terminal, and establishes said second communication path, if said second terminal has sufficient available resources.

16. A method, as claimed in claim 15, further comprising:
transmitting a message comprising an error code, from said second end-user terminal to said first end-user terminal, in the event that said second end-user terminal has insufficient resources to handle said transmission from said first terminal.

17. A method, as claimed in claim 15, further comprising:
transmitting short lived intra-LIS data transmissions over a pre-established default path established by a call initiating end-user terminal.

18. A method, as claimed in claim 15, further comprising:
transmitting long lived intra-LIS data transmissions over an SVC established by a call initiating end-user terminal.

19. A method, as claimed in claim 15, further comprising:
transmitting short lived inter-LIS data transmission over said first communication path.

20. A method, as claimed in claim 17, further comprising:
detecting and classifying, by a predetermined end-user terminal data flows as one of:
short lived intra-LIS;
long lived intra-LIS;
short lived inter-LIS; and
long lived inter-LIS.

21. A method, as claimed in claim 20, further comprising:
establishing ATM VCs only for the transmission of long lived data flows.

22. A method, as claimed in claim 20, further comprising:
transmitting short lived data flows over a system default path by-passing address resolution and connection set-up procedures.

23. A method as claimed in claim 15, further comprising:
transmitting IP data over said first communication path prior to establishment of said second communication path.

24. A method, as claimed in claim 15, further comprising:
multiplexing a plurality of connections over a single VC by an end-user terminal or a router.

25. A method, as claimed in claim 15, further comprising:
processing control messages in said plurality of routers.

26. A method, as claimed in claim 15, further comprising:
processing control messages in one of:
said plurality of routers;
an ARP server; and
an end-user terminal.

* * * * *

UNITED STATES PATENT AND TRADEMARK OFFICE
CERTIFICATE OF CORRECTION

PATENT NO. : 6,822,963 B1 Page 1 of 1
DATED : November 23, 2004
INVENTOR(S) : Kavak It is certified that error appears in the above-identified patent and that said Letters Patent is hereby corrected as shown below:

Title page,
Items [22], [86] and [87], should read as follows:

-- [22] PCT filed: October 16, 1998
 [86] PCT No.: PCT/SE98/01857
  §371 Date: September 7, 2000
  §102(e) Date: September 7, 2000
 [87] PCT Pub. No.: WO 99/21327
  PCT Pub. Date: April 29, 1999 --

Column 1,
Line 2, after the title, insert:
-- This Application is a 371 of PCT/SE98/01857, filed October 16, 1998. --

Signed and Sealed this

Twenty-second Day of February, 2005

JON W. DUDAS
*Director of the United States Patent and Trademark Office*